United States Patent [19]

Anhalt

[11] 4,084,407
[45] Apr. 18, 1978

[54] SLUSH FREEZER

[75] Inventor: Alfred E. Anhalt, Kiel, Wis.

[73] Assignee: Stoelting Brothers Company, Kiel, Wis.

[21] Appl. No.: 765,015

[22] Filed: Feb. 2, 1977

[51] Int. Cl.² .............................................. F25C 5/12
[52] U.S. Cl. .................................... 62/342; 308/163
[58] Field of Search .................. 308/163; 62/342, 343

[56] References Cited

U.S. PATENT DOCUMENTS

| 1,491,992 | 4/1924 | McCuen | 308/163 X |
| 2,606,083 | 8/1952 | Kitto et al. | 308/163 |
| 3,180,110 | 4/1965 | Dunn | 62/343 |
| 3,786,289 | 1/1974 | Baclawski et al. | 308/163 X |
| 3,971,602 | 7/1976 | Anderson | 308/163 X |

Primary Examiner—William E. Wayner
Assistant Examiner—William E. Tapolcai, Jr.
Attorney, Agent, or Firm—Joseph P. House, Jr.

[57] ABSTRACT

A slush freezer has a stationary baffle with a set of stationary fingers and a rotatable agitator having a shaft and a set of movable fingers which interleave and interact with the stationary fingers of the baffle. Interference between the movable and stationary fingers is prevented by a thrust bearing between the agitator and the baffle.

4 Claims, 3 Drawing Figures

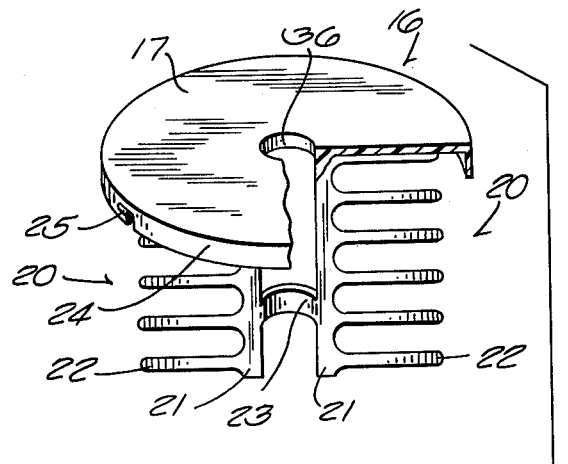
Fig. 3
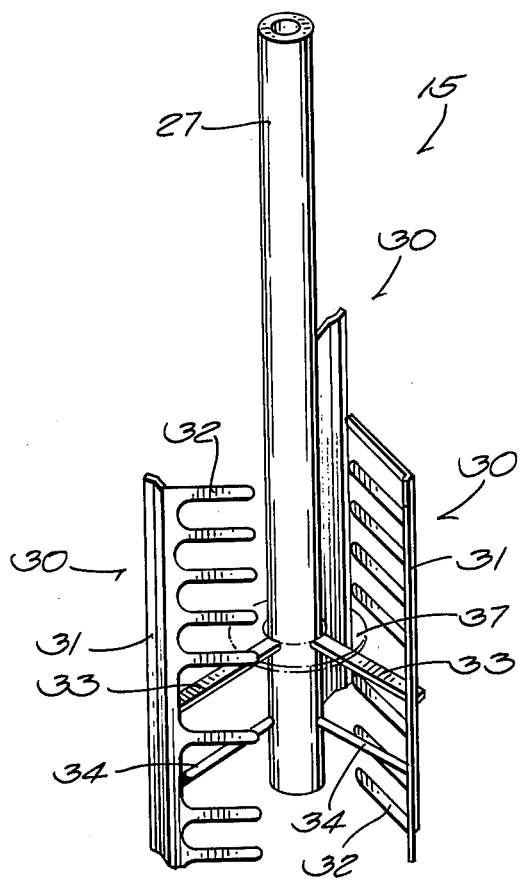

SLUSH FREEZER

BACKGROUND OF THE INVENTION

U.S. Pat. Nos. 3,069,866, 3,180,110 and 3,698,203 show slush freezers of the general construction involved. Prior art devices typified by those illustrated in the aforementioned patents are subject to the problem that, in use, the agitator may tend to lift or move axially, thus to bring the movable fingers on the agitator into conflict or interference with the fixed fingers on the baffle.

SUMMARY OF THE INVENTION

In accordance with the present invention, this problem is solved by introducing a thrust bearing which interacts between the fixed baffle and the movable agitator. This thrust bearing prevents lifting or axial movement of the agitator with respect to the fixed baffle and maintains the baffle fingers and agitator fingers in interleaved relationship and free of interference.

In the preferred embodiment, the thrust bearing comprises a washer about the agitator shaft and having one side against the baffle and its other side against the agitator.

Other objects, features, and advantages of the invention will appear from the disclosure hereof.

DESCRIPTION OF THE DRAWINGS

FIG. 3 is an exploded perspective view of the baffle, agitator and thrust bearing.

DESCRIPTION OF THE PREFERRED EMBODIMENT

Figure 1:
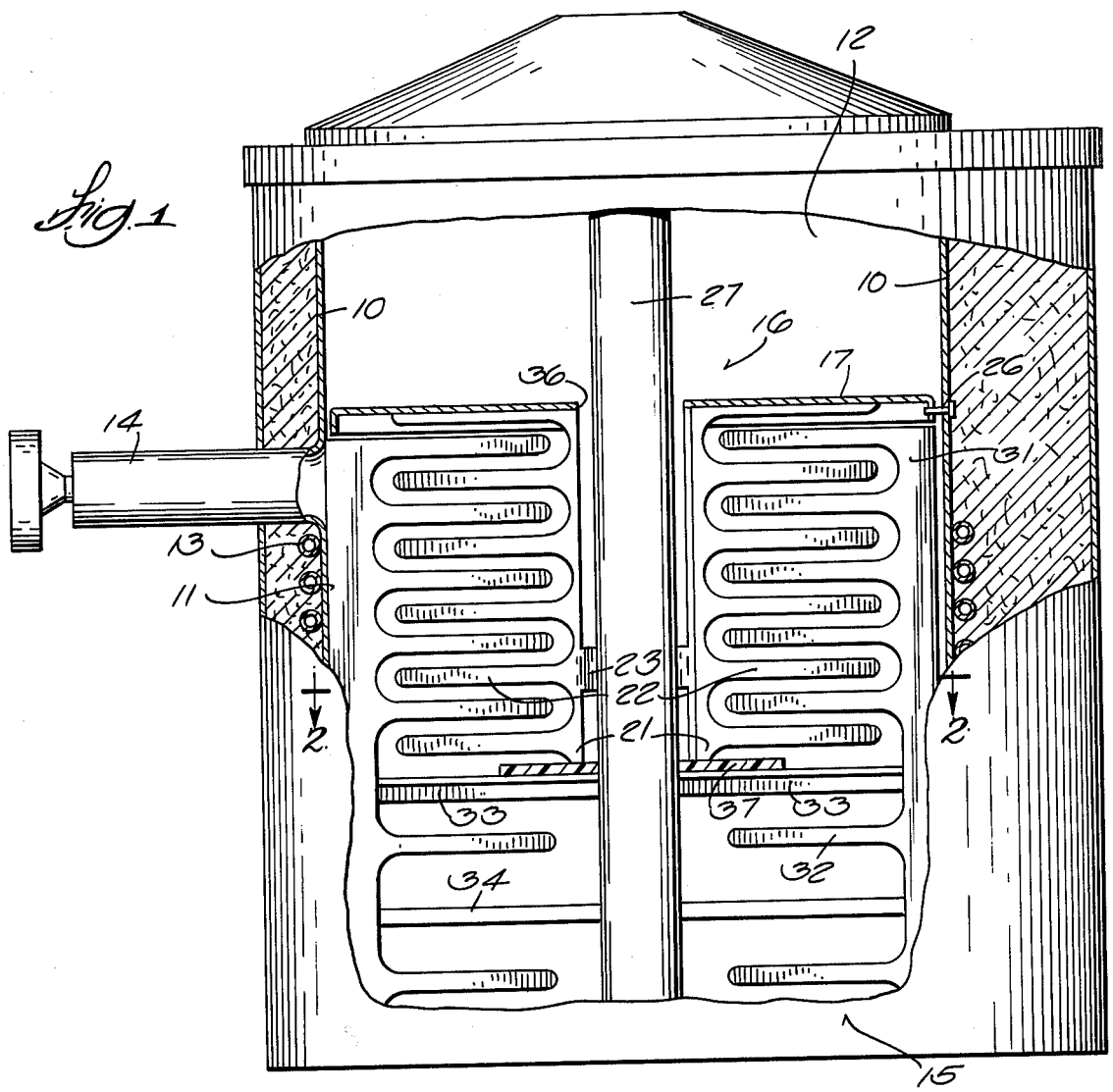
FIG. 1 is a vertical cross section taken through a slush freezer embodying the invention.

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

As in the devices disclosed in the prior patents aforesaid, the slush freezer comprises an insulation jacketed wall 10 within which there is a freezing chamber 11 and a liquid reservoir 12. Cooling coils 13 cause slush to form in the freezing chamber 11 and the slush product is dispensed through spout 14. Freezing chamber 11 contains an agitator 15 which cooperates with a fixed baffle 16 to stir the slush product to keep the slush crystals from solidifying into a solid mass and to admix liquid supplied from liquid reservoir 12 to the contents of the freezing chamber 11 as slush product is dispensed through spout 14.

The fixed baffle 16 comprises a divider disk or plate 17 to the undersurface of which is fixed the upper edges of downwardly projecting comb-like baffle plates 20. Each baffle plate 20 comprises a comb back 21 from which a series of fingers 22 project radially outwardly. In the disclosed embodiment, there are two such baffle plates 20, at diametrically opposite sides of agitator shaft 27, as illustrated. The backs are interconnected around shaft 27 by a curved brace 23.

The divider plate 17 is provided with a downturned rim 24 having a peripheral series of bayonet slots 25 by which the baffle is securely attached to the wall 10 of the reservoir by pins 26.

The agitator 15 comprises a shaft 27 which supports several stirring plates 30, each of which is in the form of a comb having a back 31 with a series of inwardly projecting fingers 32. In the disclosed embodiment, there are three such agitator stirring plates 30. The respective plates 30 are supported from the agitator shaft 27 on radial spider arms 33, 34 respectively connected at their outer ends to the comb backs 31 and at the inner ends to the shaft 27. Comb backs 31 are shaped to provide scrapers 29 to scrap ice from wall 10.

Figure 2:
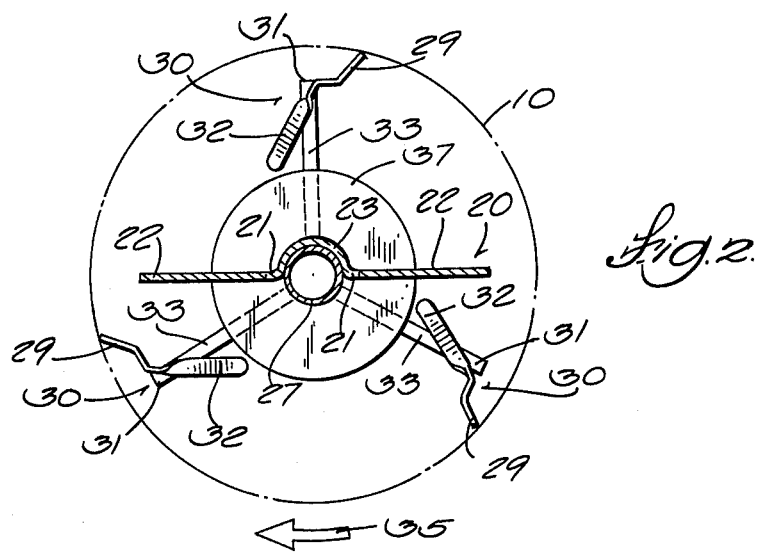
FIG. 2 is a cross section taken along the line 2—2 of FIG. 1.

As illustrated in FIGS. 2 and 3, fingers 32 of the scraper plates 30 are skewed at an angle to the spider arms 33, as is conventional in this art. The agitator rotates in the direction of arrow 35 in FIG. 2.

To assemble the baffle 16 and agitator 15, shaft 27 is advanced axially through the central opening 36 in the divider plate 17 to its position shown in FIG. 1. In fully assembled position, the inwardly projecting fingers 32 of the agitator interleave with the outwardly projecting fingers 22 of the baffle 16. Accordingly, when the agitator 15 rotates, the interleaved fingers 22, 32 effectively stir and break up agglomerations of slush, thus to keep the slush crystals in relatively discrete fragments for proper dispensing through the spout 14.

In the prior art devices above mentioned, there is a tendency for the agitator to lift or otherwise move axially during rotation thereof and under the load imposed thereon by the slush. If this happens the interleaved fingers 22, 32 may become dislocated from their interleaved relation and interfere with each other. This creates the risk of jamming of the apparatus and possible damage thereto.

For the purpose of preventing interference between the cooperating baffle and agitator fingers, and maintaining the fingers 22, 32 in proper interleaved relation, a thrust bearing is interposed between the baffle 16 and the agitator 15. In the illustrative embodiment of the drawings, the thrust bearing comprises a plastic annular washer 37 which is slipped over the agitator shaft 27 and along the shaft into its position illustrated in broken lines in FIG. 3 and full lines in FIG. 1 where its lower side rests against the agitator spider arms 33. The radius of the washer 37 is such that its outer periphery is spaced slightly inwardly of the tips of the inwardly projecting agitator fingers 3. This allows the washer 37 to easily move to its broken line position in FIG. 3, during the course of assembly of the apparatus.

When the agitator 15 is assembled to the baffle 16, as shown in FIG. 1, the upper side of the washer 37 is disposed against the lower ends of the baffle comb backs 21. As shown in FIG. 2, the washer spans between the agitator spider arms 33 and the baffle comb backs 21, even though said arms and backs are arcuately displaced around the axis of shaft 27. Accordingly, and regardless of the rotated position of the agitator 15, the washer 37 will maintain thrust engagement between the baffle at one side of the washer and the agitator at its other side. Any tendency of the agitator to lift during its rotation will be prevented by the thrust bearing washer 37 and the danger of interference between the baffle and agitator fingers has been obviated.

I claim:

1. In a slush freezer having a stationary baffle with a set of stationary fingers and a rotatable agitator having a shaft and a set of movable fingers which interact with the stationary fingers of the baffle, the improvement for preventing interference between the movable and stationary fingers and comprising a thrust bearing between the agitator and the baffle, said stationary baffle comprising a comb having a back from which the fingers extend, said thrust bearing comprising an annular ring about the agitator shaft and having one side against the comb back and its other side against the agitator.

2. The invention of claim 1 in which the agitator comprises an arm extending outwardly from the shaft and supporting the agitator fingers, said arm being against said other side of the annular ring.

3. The invention of claim 2 in which the agitator fingers are in the form of a comb having a back attached to said arm.

4. In a slush freezer having a stationary baffle with a set of stationary fingers and a rotatable agitator having a shaft and a set of movable fingers which interact with the stationary fingers of the baffle, the improvement for preventing interference between the movable and stationary fingers and comprising a thrust bearing between the agitator and the baffle, said thrust bearing comprising a washer about the agitator shaft and having one side against the baffle and its other side against the agitator, said agitator comprising a comb having a back from which the fingers extend inwardly toward the agitator shaft, an arm spanning between the comb back and the shaft to support the comb, said fingers having tips spaced from the shaft a distance greater than the radius of the washer to permit the washer to slide along the shaft to a position engaging the arm without interference with the fingers.

* * * * *